(12) United States Patent
Wisnudel et al.

(10) Patent No.: US 6,537,636 B1
(45) Date of Patent: Mar. 25, 2003

(54) DATA STORAGE MEDIA CONTAINING CLEAR POLYCARBONATE BLENDS

(75) Inventors: Marc Brian Wisnudel, Clifton Park, NY (US); Irene Dris, Clifton Park, NY (US); Gary Charles Davis, Albany, NY (US); Ramesh Hariharan, Guilderland, NY (US); Cornelis Jan Maria Rijken, Bergen op Zoom (NL); Jeroen Johannes Cornelis van Ginneken, Tilburg (NL); Steven Frederick Hubbard, West Sand Lake, NY (US)

(73) Assignee: General Electric Company, Nishkayuna, NY (US)

( * ) Notice: Subject to any disclaimer, the term of this patent is extended or adjusted under 35 U.S.C. 154(b) by 80 days.

(21) Appl. No.: 09/584,174

(22) Filed: Jun. 5, 2000

(51) Int. Cl.[7] .......................... B32B 3/02; C08G 64/00; F21V 29/00
(52) U.S. Cl. .................. 428/64.1; 428/64.6; 428/64.7; 528/196; 362/273
(58) Field of Search .............................. 428/64.1, 64.6; 528/196; 362/273

(56) References Cited

U.S. PATENT DOCUMENTS

| 5,132,154 A | 7/1992 | Westeppe et al. |
|---|---|---|
| 5,382,489 A | 1/1995 | Ojima et al. |
| 5,486,577 A | 1/1996 | Farah et al. |
| 5,579,296 A * | 11/1996 | Smith et al. ................. 369/273 |
| 6,001,953 A | 12/1999 | Davis et al. |

FOREIGN PATENT DOCUMENTS

| EP | 0 166 834 | 1/1986 |
|---|---|---|
| EP | 0 508 716 | 10/1992 |
| JP | 7326842 | 4/1973 |

OTHER PUBLICATIONS

PCT Search Report, International Application No. PCT/US 01/13421, International Filing Date Apr. 27, 2001.

Kim, CK et al, "*Effects of Polycarbonate Molecular Structure on the Miscibility with Other Polymers*", Macromolecules, American Chemical Society, Easton, US, vol. 25, No. 12, pp. 3097–3105, Jun. 8, 1992.

* cited by examiner

*Primary Examiner*—Cynthia H. Kelly
*Assistant Examiner*—L. Ferguson
(74) *Attorney, Agent, or Firm*—S. Bruce Brown; Noreen C. Johnson

(57) ABSTRACT

Polymer blends suitable for use in optical article. The polymer blends comprise a first and second polycarbonate and have properties particularly suited for use in high density optical data storage media.

16 Claims, No Drawings

DATA STORAGE MEDIA CONTAINING CLEAR POLYCARBONATE BLENDS

FIELD OF THE INVENTION

This invention relates to clear blends of polycarbonates suitable for use in optical articles. This invention further relates to optical articles, and methods for making optical articles from the clear blends.

In addition to use as optical articles, the blends of the invention are useful in producing clear articles of manufacture having good properties. These properties include food chemical resistance and melt processibility. These blends are especially useful for making clear molded articles, fibers, films and sheeting.

BACKGROUND OF THE INVENTION

Polycarbonates and other polymer materials are utilized in optical data storage media, such as compact disks. In optical data storage media, it is critical that polycarbonate resins have good performance characteristics such as transparency, low water affinity, good processibility, good heat resistance and low birefringence. High birefringence is particularly undesirable in high density optical data storage media.

Improvements in optical data storage media, including increased data storage density, are highly desirable, and achievement of such improvements is expected to improve well established and new computer technology such as read only, write once, rewritable, digital versatile and magneto-optical (MO) disks.

In the case of CD-ROM technology, the information to be read is imprinted directly into a moldable, transparent plastic material, such as bisphenol A (BPA) polycarbonate. The information is stored in the form of shallow pits embossed in a polymer surface. The surface is coated with a reflective metallic film, and the digital information, represented by the position and length of the pits, is read optically with a focused low power (5 mW) laser beam. The user can only extract information (digital data) from the disk without changing or adding any data. Thus, it is possible to "read" but not to "write" or "erase" information.

The operating principle in a write once read many (WORM) drive is to use a focused laser beam (20–40 mW) to make a permanent mark on a thin film on a disk. The information is then read out as a change in the optical properties of the disk, e.g., reflectivity or absorbance. These changes can take various forms: "hole burning" is the removal of material, typically a thin film of tellurium, by evaporation, melting or spalling (sometimes referred to as laser ablation); bubble or pit formation involves deformation of the surface, usually of a polymer overcoat of a metal reflector.

Although the CD-ROM and WORM formats have been successfully developed and are well suited for particular applications, the computer industry is focusing on erasable media for optical storage (EODs). There are two types of EODs: phase change (PC) and magneto-optic (MO). In MO storage, a bit of information is stored as a ~1 µm diameter magnetic domain, which has its magnetization either up or down. The information can be read by monitoring the rotation of the plane polarization of light reflected from the surface of the magnetic film. This rotation, called the Magneto-Optic Kerr Effect (MOKE) is typically less than 0.5 degrees. The materials for MO storage are generally amorphous alloys of the rare earth and transition metals.

Amorphous materials have a distinct advantage in MO storage as they do not suffer from "grain noise", spurious variations in the plane of polarization of reflected light caused by randomness in the orientation of grains in a polycrystalline film. Bits are written by heating above the Curie point, $T_c$, and cooling in the presence of a magnetic field, a process known as thermomagnetic writing. In the phase-change material, information is stored in regions that are different phases, typically amorphous and crystalline. These films are usually alloys or compounds of tellurium which can be quenched into the amorphous state by melting and rapidly cooling. The film is initially crystallized by heating it above the crystallization temperature. In most of these materials, the crystallization temperature is close to the glass transition temperature. When the film is heated with a short, high power focused laser pulse, the film can be melted and quenched to the amorphous state. The amorphized spot can represent a digital "1" or a bit of information. The information is read by scanning it with the same laser, set at a lower power, and monitoring the reflectivity.

In the case of WORM and EOD technology, the recording layer is separated from the environment by a transparent, non-interfering shielding layer. Materials selected for such "read through" optical data storage applications must have outstanding physical properties, such as moldability, ductility, a level of robustness compatible with popular use, resistance to deformation when exposed to high heat or high humidity, either alone or in combination. The materials should also interfere minimally with the passage of laser light through the medium when information is being retrieved from or added to the storage device.

As data storage densities are increased in optical data storage media to accommodate newer technologies, such as digital versatile disks (DVD) and higher density data disks for short or long term data archives, the design requirements for the transparent plastic component of the optical data storage devices have become increasingly stringent. In many of these applications, previously employed polycarbonate materials, such as BPA polycarbonate materials, are inadequate. Materials displaying lower birefringence at current, and in the future progressively shorter "reading and writing" wavelengths have been the object of intense efforts in the field of optical data storage devices.

Low birefringence alone will not satisfy all of the design requirements for the use of a material in optical data storage media; high transparency, heat resistance, low water absorption, ductility, high purity and few inhomogeneities or particulates are also required. Currently employed materials are found to be lacking in one or more of these characteristics, and new materials are required in order to achieve higher data storage densities in optical data storage media. In addition, new materials possessing improved optical properties are anticipated to be of general utility in the production of other optical articles, such as lenses, gratings, beam splitters and the like.

Birefringence in an article molded from polymeric material is related to orientation and deformation of its constituent polymer chains. Birefringence has several sources, including the structure and physical properties of the polymer material, the degree of molecular orientation in the polymer material and thermal stresses in the processed polymer material. For example, the birefringence of a molded optical article is determined, in part, by the molecular structure of its constituent polymer and the processing conditions, such as the forces applied during mold filling and cooling, used in its fabrication which can create thermal stresses and orientation of the polymer chains.

The observed birefringence of a disk is therefore determined by the molecular structure, which determines the intrinsic birefringence, and the processing conditions, which can create thermal stresses and orientation of the polymer chains. Specifically, the observed birefringence is typically a function of the intrinsic birefringence and the birefringence introduced upon molding articles, such as optical disks. The observed birefringence of an optical disk is typically quantified using a measurement termed "in-plane birefringence" or IBR, which is described more fully below.

For a molded optical disk, the IBR is defined as:

$$IBR=(n_r-n_\theta)d=\Delta n_{r\theta}d \quad (3)$$

where $n_r$ and $n_\theta$ are the refractive indices along the r and θ cylindrical axes of the disk; $n_r$ is the index of refraction seen by a light beam polarized along the radial direction, and $n_\theta$ is the index of refraction for light polarized azimuthally to the plane of the disk. The thickness of the disk is given by d. The IBR governs the defocusing margin, and reduction of IBR will lead to the alleviation of problems which are not correctable mechanically. IBR is a property of the finished optical disk. It is formally called a "retardation" and has units of nanometers.

In applications requiring higher storage density, the properties of low birefringence and low water absorption in the polymer material from which the optical article is fabricated become even more critical. In order to achieve higher data storage density, low birefringence is necessary so as to minimally interfere with the laser beam as it passes through the optical article, for example a compact disk.

Another critical property needed for high data storage density applications is disk flatness. The disk flatness is dependent upon the flatness of the polycarbonate substrate immediately after the injection molding process as well as the dimensional stability of the substrate upon exposure to high humidity environments. It is known that excessive moisture absorption results in disk skewing which in turn leads to reduced reliability. Since the bulk of the disk is comprised of the polymer material, the flatness of the disk depends on the low water solubility and low rate of water diffusion into the polymeric material. In addition, the polymer should be easily processed in order to product high quality disks through injection molding.

There exists a need for compositions having good optical properties and good processibility and which are suitable for use in high density optical recording media. Polycarbonates manufactured by copolymerizing the aforementioned aromatic dihydroxy compounds, such as bisphenol A, with other monomers, such as SBI, may produce acceptable birefringence; however the glass transition temperature and melt viscosity is often too high, resulting in poor processing characteristics. Consequently, the obtained moldings have low impact resistance and low pit replication. Further, the water absorption of such polycarbonates is unacceptable for higher density applications.

BRIEF SUMMARY OF THE INVENTION

The present invention solves these problems, and provides further surprising properties. These and further objects of the invention will be more readily appreciated when considering the following disclosure and appended claims.

In one aspect, the invention relates to optical articles comprising a miscible, clear blend composition, the miscible clear blend composition comprising:

A) from 1 to 99% by weight of a first polycarbonate comprising structural units having the formula (I)

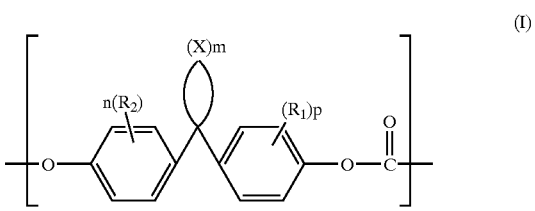

where $R_1$ and $R_2$ are independently selected from the group consisting of $C_1$–$C_6$ alkyl;
X represents $CH_2$;
m is an integer from 4 to 7;
n is an integer from 1 to 4; and
p is an integer from 1 to 4
with the proviso that at least one of $R_1$ or $R_2$ is in the 3 or 3' position;
and wherein the structural units of formula (I) comprise from 1 to 100 mole % of the first polycarbonate; and B) from 1 to 99% by weight of a second polycarbonate comprising structural units having the formula (II) where
$R_{18}$ is independently selected from the group consisting of halogen, hydrogen, monovalent $C_1$–$C_6$ hydrocarbon, monovalent $C_1$–$C_6$ hydrocarbonoxy radicals,
$R_{19}$ is independently selected from the group consisting of halogen, hydrogen, monovalent $C_1$–$C_6$ hydrocarbon, and monovalent $C_1$–$C_6$ hydrocarbonoxy radicals;
W is selected from the group consisting of substituted or unsubstituted divalent $C_1$–$C_{18}$ hydrocarbon radicals,

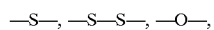

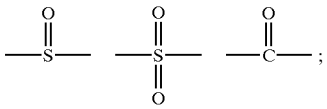

each n is independently selected from integers having a value of from 0 to 4 inclusive; and b is zero or one;
wherein the structural units (II) comprise from about 1 to 100 mole % of the second polycarbonate; and
wherein the total weight percent of first polycarbonate (A) and second polycarbonate (B) is equal to 100 weight percent.

The miscible clear blend compositions preferably have a glass transition temperature from 120° C. to about 185° C. and a water absorption of less than about 0.33%.

In a further embodiment of the invention, the second polycarbonate of the clear blend composition is a polyestercarbonate, the polyestercarbonate, in addition to structural units of formula I, further comprising structural units of formula (V)

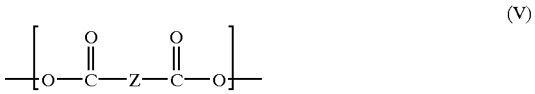

wherein Z is a $C_1$–$C_{40}$ branched or unbranched alkyl or branched or unbranched cycloalkyl.

In a further aspect, this invention relates to optical articles that are data storage media having both a data storage layer and an adjacent transparent overlayer wherein the data storage layer is capable of reflecting an energy field incident upon said transparent overlayer prior to being incident upon said data layer. Specifically, this aspect of the invention relates to data storage media having thin transparent overlayers of the defined miscible clear blend composition. As mentioned, DVDs are data storage media. The DVD typically has two substrates, each about 120 mm in radius and only about 0.6 mm thick. These substrates are bonded together to make a double-sided optical medium.

The invention further relates to methods of making optical articles from these clear blend compositions. In one embodiment of this invention, structure (I) is a residue 1,1-bis(4-hydroxy-3-methyl phenyl)cyclohexane (BCC), and in another embodiment, the first polycarbonate is a homopolycarbonate of BCC.

DETAILED DESCRIPTION OF THE INVENTION

The present invention may be understood more readily by reference to the following detailed description of preferred embodiments of the invention and the Examples included therein.

Before the present compositions of matter and methods are disclosed, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings.

The singular forms "a," "an" and "the" include plural referents unless the context clearly dictates otherwise.

"Optional" or "optionally" means that the subsequently described event or circumstances may or may not occur, and that description includes instances where the event or circumstance occurs and instances where it does not.

"BPA" is herein defined as bisphenol A or 2,2-bis(4-hydroxyphenyl)propane.

"BCC" is herein defined as 1,1-bis(4-hydroxy-3-methyl phenyl)cyclohexane.

"Polycarbonate" or "polycarbonates" as used herein includes copolycarbonates, homopolycarbonates and (co)polyester carbonates.

"Optical articles" as used herein includes optical disks and optical data storage media, for example a compact disk (CD audio or CD-ROM), a digital versatile disk, also known as DVD (ROM,RAM, rewritable), a magneto optical (MO) disk and the like; optical lenses, such as contact lenses, lenses for glasses, lenses for telescopes, and prisms; optical fibers; information recording media; information transferring media; high density data storage media, disks for video cameras, disks for still cameras and the like; as well as the substrate onto which optical recording material is applied. In addition to use as a material to prepare optical articles, the polycarbonate may be used as a raw material for films or sheets.

Unless otherwise stated, "mol %" in reference to the composition of a polycarbonate in this specification is based upon 100 mol % of the repeating units of the polycarbonate. For instance, "a polycarbonate comprising 90 mol % of BCC" refers to a polycarbonate in which 90 mol % of the repeating units are residues derived from BCC diphenol or its corresponding derivative(s). Corresponding derivatives include but are not limited to, corresponding oligomers of the diphenols; corresponding esters of the diphenol and their oligomers; and the corresponding chloroformates of the diphenol and their oligomers.

The terms "residues" and "structural units", used in reference to the constituents of the polycarbonate, are synonymous throughout the specification.

Throughout this application where publications are referenced, the disclosures of these publications in their entireties are hereby incorporated by reference into this application in order to more fully describe the state of the art to which this invention pertains.

As mentioned, in one aspect, this invention relates to optical articles comprising clear blend compositions, the clear blend compositions comprising:

A) from 1 to 99% by weight of a first polycarbonate comprising structural units having the formula (I)

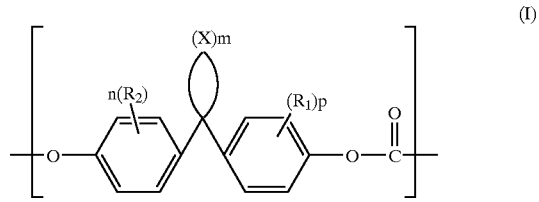

where $R_1$ and $R_2$ are independently selected from the group consisting of $C_1$–$C_6$ alkyl;
X represents $CH_2$;
m is an integer from 4 to 7;
n is an integer from 1 to 4; and
p is an integer from 1 to 4
with the proviso that at least one of $R_1$ or $R_2$ is in the 3 or 3' position;
and wherein the structural units of formula (I) comprise from 1 to 100 mole % of the first polycarbonate; and B) from 1 to 99% by weight of a second polycarbonate comprising structural units having the formula (II)
where
$R_{18}$ is independently selected from the group consisting of halogen, hydrogen, monovalent $C_1$–$C_6$ hydrocarbon, monovalent $C_1$–$C_6$ hydrocarbonoxy radicals,
$R_{19}$ is independently selected from the group consisting of halogen, hydrogen, monovalent $C_1$–$C_6$ hydrocarbon, and monovalent $C_1$–$C_6$ hydrocarbonoxy radicals;
W is selected from the group consisting of substituted or unsubstituted divalent $C_1$–$C_{18}$ hydrocarbon radicals,

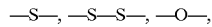

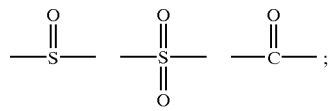

each n is independently selected from integers having a value of from 0 to 4 inclusive; and b is zero or one; wherein the structural units (II) comprise from about 1 to 100 mole % of the second polycarbonate; and wherein the total weight percent of first polycarbonate (A) and second polycarbonate (B) is equal to 100 weight percent.

In a further embodiment, the second polycarbonate of the clear blend composition is a polyestercarbonate, the polyestercarbonate further comprising, in addition to structural units of formula I, structural units of formula V.

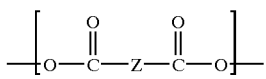

(V)

wherein Z is a $C_1$–$C_{40}$ branched or unbranched alkyl or branched or unbranched cycloalkyl.

Clear, miscible blends of two polymers are rare. The term "miscible" refers to blends that are a mixture on a molecular level wherein intimate polymer-polymer interaction is achieved. Miscible blends are clear, not translucent or opaque. Differential scanning calorimetry testing detects only a single glass transition temperature (Tg) for miscible blends composed of two or more components. In addition, scanning electron microscopy detects $n_\theta$ contrast indicative of immiscible phases. As mentioned, the blends of the present invention are clear. The term "clear" is defined herein as an absence of cloudiness, haziness, and mudiness when inspected visually.

The applicants were very surprised to discover clear, miscible, blends of the polycarbonate of structure (I) and polycarbonates of structure (II) as discussed in commonly assigned, copending US patent application GE docket number RD27415 "Clear Polymer Blends", herein incorporated by reference. Further, applicants were surprised to discover that these blends possess suitable properties for use as optical articles.

A blending process, as opposed to a copolymerization process, provides advantages. The blending process allows for the production of compositions that are either too expensive or unattainable by a copolymerization process. Optionally, the blends may also be extruded with catalysts and diphenyl carbonate for the purpose of controlling the molecular weight and viscosity of the resulting compositions. Suitable catalysts include, but are not limited to, tetraalkylammonium hydroxide, such as tetrabutylphosphonium hydroxide; diethyldimethylammonium hydroxide; and tetraalkylphosphonium hydroxide.

The blend composition further provides polycarbonate blends having good optical properties and suitable glass transition temperatures, and which are suitable for use in optical articles. Suitable glass transition temperatures are necessary to provide adequate processibility, for example good molding characteristics.

The applicants have found that blends comprising the first and second polycarbonates, as defined herein, are also suitable for use in high data storage density optical media. In particular the blends of the present invention have good transparency, low water absorption, good processibility, good thermal stability, and low birefringence.

As discussed above, the clear blend compositions comprising the first and second polycarbonate posses suitable properties for use in optical media. The blends of this invention preferably have glass transition temperatures in the range of 100° C. to 185° C., more preferably 125° to 165° C., even more preferably 130 to 150° C. The water absorption of the polycarbonates is preferably below 0.33%, even more preferably less than about 0.2% at equilibrium. The IBR values of a disk molded from the blend are about −100 nanometers to about 100 nanometers; preferably about −50 nanometers to about 50 nanometers, even more preferably about −40 to about 40 nanometers.

The number average molecular weight (Mn) of the first polycarbonate and the second polycarbonate, as determined by gel permeation chromatography relative to polystyrene, is preferably from about 10,000 to about 100,000, more preferably between about 10,000 to about 50,000, even more preferably between about 12,000 to about 40,000. The polymer blends of the present invention preferably have a light transmittance of at least about 85%, more preferably at least about 90%.

The compositions of the particular blend may be varied within certain ranges to achieve the suitable property profile. The blends of the present invention are about 1 to about 99 weight percent of the first polycarbonate portion and about 1 to about 99 weight percent of the second polycarbonate portion, with the total weight percent of the first and second polycarbonate portion preferably equal to 100 weight percent.

The preferred blends of the present invention is from about 20 to about 99 weight percent of the first polycarbonate and from about 1 to about 80 weight percent of the second polycarbonate; more preferably about 40 to about 99 weight percent of the first polycarbonate and about 1 to about 60 weight percent of the second polycarbonate; even more preferably a weight percent of about 45 to about 55 weight percent for both the first and the second polycarbonate.

The particular composition may be adjusted depending on a number of factors including the end use of the blend and the desired properties of the blend. For example, more of the first polycarbonate in the blend helps maintain low water absorption and good birefringence. More of the second polycarbonate in the blend helps maintain good ductility and processibility.

Residues of structure I preferably comprise from 1 to 100 mol % of the first polycarbonate; preferably from 10 to 100 mol % of the first polycarbonate, more preferably from 30 to 100 mol % of the first polycarbonate, even more preferably from 60 to 100 mol % of the second polycarbonate. In one embodiment, residues of structure I comprise from 90 to 100 mole % of the second polycarbonate. In a further embodiment, the first polycarbonate consists essentially of residues of structure I.

Representative units structure I include, but are not limited to, residues of 1,1-bis(4-hydroxy-3-methylphenyl) cyclohexane (BCC); 1,1-bis(4-hydroxy-3-methylphenyl) cyclopentane; 1,1-bis(4-hydroxy-3-methylphenyl) cycloheptane and mixtures thereof. Residues of BCC are most preferred as structural units I.

In one embodiment of the invention, the first polycarbonate comprises from 90 to 100 mol % of residues of BCC, structure (VI). BCC may be easily synthesized from cyclohexanone and ortho-cresol.

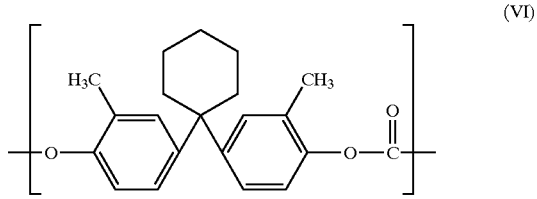

(VI)

A polycarbonate, comprising 100 mol % of structural units derived from BCC, is herein referred to as "BCC homopolycarbonate".

In the present invention, it is critical that the structural units of formula (I) be substituted in the 3 or 3' position by at least one of $R_1$ or $R_2$. It is preferable that n and p are equal to one, and that $R_1$ and $R_2$ are present in the 3 and 3' positions, respectively. $R_1$ and $R_2$ are preferably $C_1$–$C_6$ alkyl, more preferably $C_1$–$C_3$ alkyl, even more preferably $CH_3$.

Residues of structure II preferably comprises from 1 to 100 mol % of the second polycarbonate, preferably from 10 to 100 mol % of the second polycarbonate, even more preferably from 60 to 99 mol % of the second polycarbonate, even more preferably 90 to 99 mole % of the second polycarbonate. In one embodiment, the second polycarbonate consists of residues of BPA exclusively, i.e. 100 mol %, based on 100 mol % of repeating units b) in the polycarbonate.

Representative units of structure II include, but are not limited to, residues of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl) propane; and mixtures thereof. Residues of BPA are preferred as structure II.

Optionally, the second polycarbonate may comprise from 0.1 to 20 mol % of structural units of structure (V):

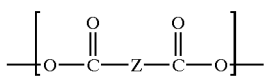

wherein Z is a $C_1$–$C_{40}$ branched or unbranched alkyl or branched or unbranched cycloalkyl.

Representative units of structure (V) include, but are not limited to, residues of dodecanedioic acid, sebacic acid, adipic acid, octadecanedioic acid, octadec-9-enedioic acid, 9-carboxyoctadecanoic acid and 10-carboxyoctadecanoic acid and mixtures thereof. Residues of dodecanedioic acid (DDDA) are the more preferred.

In one embodiment, the second polycarbonate comprises at least 60 mol %, more preferably at least 80 mol % of residues of BPA. In a further embodiment, the second polycarbonate comprises at least 60 mol % of residues of BPA, and from about 1 to about 10 mol % of residues of DDDA. In an even further embodiment, the second polycarbonate comprises from about 60 to 80 mol % of residues of BPA and from about 10 to about 20 mol % of residues of DDDA.

Representative units of structure (V) include, but are not limited to, residues of dodecanedioic acid, sebacic acid, adipic acid, octadecanedioic acid, octadec-9-enedioic acid, 9-carboxyoctadecanoic acid and 10-carboxyoctadecanoic acid. Residues of dodecanedioic acid are the more preferred.

The polycarbonates as described may be prepared by the interfacial or the melt process. If the interfacial process is used, the addition of various phase transfer catalysts is optional. Phase transfer catalysts which are suitable include, but are not limited to tertiary amines, such as triethylamine, ammonium salts, such as tetrabutylammonium bromide; or hexaethylguanidinium chloride. Monofunctional phenols, such as p-cumylphenol and 4-butylphenol; long chain alkylphenols, such as cardanol and nonyl phenol; and difunctional phenols may be used as chain stopping agents. Optionally 0.1 to 10 mole %, more preferably 4 to 10 mole %, more preferably 4 to 7% of chainstopping agent may be incorporated into the first or second polycarbonate, based on the total moles of the repeating units.

In some instances, the phosgenation conditions must be adjusted. In particular, the phosgenation conditions should be adjusted in cases where the formation of undesired cyclic oligomers is favored by the characteristic reactivity of the monomer, which is related to monomer solubility in the reaction medium and monomer structure. In the case of BCC, for example, cyclic oligomer formation occurs to a greater extent under standard interfacial polymerization conditions than in the case of, for example, BPA. In polycarbonates containing substantial more than about 20 mol % of BCC, it is advantageous to use an excess of phosgene to promote the formation of linear bischloroformate oligomers which are converted to high molecular weight polymers by partial hydrolysis and polycondensation. Preferably from about 20 to 200 mol % of excess phosgene is used.

The polycarbonates as described may also be prepared by the melt or transesterification process. This process does not require the use of phosgene or a solvent and minimizes the formation of low molecular weight contaminants, such as cyclic and linear low molecular weight oligomers in the final polymer. The monomers are mixed with a carbonate source, such as a diarylcarbonate, and a small amount of catalyst, such as an alkali metal hydroxide or ammonium hydroxide and heated under a vacuum according to a protocol in which the temperature is raised through a series of stages while the pressure in the headspace over the reaction mixture is lowered from ambient pressure to about 1 torr.

Suitable carbonate sources, catalysts and reaction conditions are found in U.S. Pat. No. 5,880,248, and *Kirk-Othmer Encyclopedia of Chemical Technology*, Fourth Edition, Volume 19, pp. 585–600, herein incorporated by reference. The time of the stages and the temperature are such that mechanical losses of material through foaming and the like are avoided. Phenol and excess diphenyl carbonate are removed overhead to complete the polymerization process. The product high polymer is then isolated as a melt which may be compounded with other additives, such as stabilizers and mold release agents prior to pelletization. The products produced by the melt process have reduced numbers of undissolved particles and reduced content of low molecular weight contaminants, such as cyclic oligomers, relative to the interfacially produced product.

The clear blends of the present invention may optionally be blended with any conventional additives used in optical applications, including but not limited to dyestuffs, UV stabilizers, antioxidants, heat stabilizers, and mold release agents, to form an optical article. In particular, it is preferable to form a blend of the polycarbonate and additives which aid in processing the blend to form the desired optical article. The blend may optionally comprise from 0.0001 to 1.0% by weight of the desired additives, more preferably from 0.0001 to 1.0% by weight of the desired additives.

Substances or additives which may be added to the polycarbonates of this invention, include, but are not limited to, heat-resistant stabilizer, UV absorber, mold-release agent, antistatic agent, slip agent, antiblocking agent, lubricant, anticlouding agent, coloring agent, natural oil, synthetic oil, wax, organic filler, inorganic filler and mixtures thereof. Suitable antistatic agents include distearylhydroxylamine, triphenyl amine, tri-n-octylphosphine oxide, triphenyl phosphine oxide, pyridine N-oxide, ethoxylated sorbitan monolaurate, and poly (alkylene glycol) compounds.

Examples of the aforementioned heat-resistant stabilizers, include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either pigments or dyes. Inorganic coloring agents and organic coloring agents may be used separately or in combination in the invention.

Optionally, suitable carbonate redistribution catalysts may be introduced into the blend. Suitable redistribution catalysts include a wide variety of bases and Lewis acids. Elustrative examples include, amines, particularly 1,3-dimethylaminopropane, imidazole, benzimidazole, and benzotriazole, as well as other organic bases, for example tetraalkylammonium hydroxides, such as tetramethylammonium hydroxide, usually as the pentahydrate, diethyldimethylammonium hydroxide, and tetraethylammonium hydroxide; tetraalkylammonium phenoxides, such as tetramethylammonium phenoxide, usually as the monohydrate; tetraalkylammonium acetates, such as tetramethylammonium acetate; tetraalkylammonium tetraphenylborates, such as tetramethylammonium tetraphenylborate; as well as lithium stearate, the lithium salt of bisphenol A, the tetraethylammonium salt of bisphenol A, sodium phenoxide, and the like. Other suitable organic bases include phosphines, for example, triphenylphosphine. A wide variety of organometallics are suitable catalysts, including organotin compounds, such as di(n-butyl)tin oxide, di(n-octyl)tin oxide, di(n-butyl)tin dibutoxide, di(n-butyl)tin dioctoate, dibutyltin, tetrabutyltin, tributyltin trifluoroacetate, tributyltin chlorophenoxide, bis[(dibutyl)(phenoxy)tin] oxide, and tributyltin hydride; as well as organotitanium compounds, such as titanium tetra(isopropoxide), titanium tetra(5-methylheptoxide), and titanium tetra(butoxide); as well as, zirconium tetra(isopropoxide), aluminum tri(ethoxide), aluminum tri(phenoxide), mercuric acetate, lead acetate, (diphenyl)mercury, (tetraphenyl)lead, and (tetraphenyl) silane. Also suitable are a variety of hydrides, including sodium hydride, lithium hydride, aluminum hydride, boron trihydride, tantalum and niobium hydride, lithium aluminum hydride, lithium borohydride, sodium borohydride, tetramethylammonium borohydride, tetra(n-butylammonium) borohydride, lithium tri(t-butoxy) aluminum hydride, and diphenylsilane; as well as simple inorganics, such as lithium hydroxide, sodium silicate, sodium borate, silica, lithium fluoride, lithium chloride, lithium carbonate, and zinc oxide.

The first and second polycarbonates may be random copolymers, block copolymers or graft copolymers. When graft copolymers and other branched polymers are prepared a suitable branching agent is used during production.

The desired optical article may be obtained by molding the polycarbonate or polycarbonate blend by injection molding, compression molding, extrusion methods and solution casting methods. Injection molding is the more preferred method of forming the article.

Because the polycarbonates of the present invention possess advantageous properties such as low water absorption, good processibility and low birefringence, they can be advantageously utilized to produce optical articles. End-use applications for the optical article of the invention include, but are not limited to, a digital audio disk, a digital versatile disk, an optical memory disk, a compact disk, an ASMO device and the like; optical lenses, such as contact lenses, lenses for glasses, lenses for telescopes, and prisms; optical fibers; magneto optical disks; information recording media; information transferring media; disks for video cameras, disks for still cameras and the like.

The polycarbonate may function as the medium for data storage, i.e. the data may be fixed onto or into the polycarbonate. The polycarbonate may also function as the substrate onto which a data storage medium is applied. Further, some combination of both functions may be employed in a single device, as for instance when the polycarbonate is imprinted with tracking to aid in reading a data storage medium which is applied to the polycarbonate.

In addition to use as optical articles, the blends of the invention are useful in producing clear articles of manufacture having good properties. These properties include food chemical resistance and melt processibility. These blends are especially useful for making molded articles, fibers, films and sheeting.

The blends of the present invention can be made by methods which include the steps of blending the first and second polycarbonate at a temperature of from about 240° C. to about 300° C. for a time sufficient to form a clear blend composition. Suitable methods for forming the blend include, but are not limited to the melt method, the solution prepared method, the dry blending method and extrusion.

In addition to the first and second polycarbonate portions described above, the blends of the present invention may include at least one other modifying polymer. Suitable modifying polymers are those which form miscible blends with the first and second polycarbonate portions. Possible modifying polymers include other polycarbonates, polyesters, polyamides, polystyrenes, polyurethanes, polyarylates, liquid crystalline polymers, vinyl polymers and the like, and mixtures thereof. Suitable modifying polymers may be determined by one of ordinary skill in the art by performing traditional miscibility tests with possible modifying polymers.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in ° C. or is at room temperature and pressure is at or near atmospheric.

The materials and testing procedures used for the results shown herein are as follows:

Molecular weights are reported as number average (Mn) and weight average (Mw) in units of grams/mole. Molecular weights were determined by gel permeation chromotography using an HP 1090 HPLC with two Polymer Labs Mixed Bed C columns at 35° C., a flowrate of 1 ml/min, using chloroform as solvent and a calibration based on polystyrene standards.

Water absorption (% $H_2O$) was determined by the following method which is similar to ASTM D570, but modified to account for the variable thickness of the parts described in the examples. The plastic part or disk was dried in a vacuum for over 1 week. The sample was removed periodically and weighed to determine if it was dry (stopped loosing mass). The sample was removed from the oven, allowed to equilibrate to room temperature in a dessicator, and the dry weight was recorded. The sample was immersed in a water bath at 23° C. The sample was removed periodically from the bath, the surface was blotted dry, and the weight recorded. This step was performed as quickly as possible so that this measurement time is small compared to the time between measurements. The sample was repeatedly immersed and the weight measured until the sample became substantially saturated. As the diffusion scales as the square root of time, it is often desirable to take the measurements more rapidly initially (every 30 minutes for example) and then less often later on (once a day, and then once a week, for example). The sample was considered substantially saturated or at "equilibrium" when the increase in weight in a 2 week period averaged less than 1% of the total increase in weight (as described in ASTM method D-570-98 section 7.4). Diffusion coefficients were obtained by plotting the mass of water absorbed, $M_{uptake}$, versus time, t, and fitting this curve to the following equation (expanded to the first 10 terms):

$$M_{uptake}/M_{eq} = 1 - \sum_{n=0}^{\infty} \{8/(2n+1)^2\pi^2 \exp(-D(2n+1)^2\pi^2 t/(4L^2))\}$$

where $M_{eq}$ is the mass of water absorbed at equilibrium, D is the diffusivity in units of cm$^2$/s and L is the part thickness in units of cm.

$T_g$ values were determined by differential scanning calorimetry using a PERKIN ELMER DSC7. The Tg was calculated based on the ½ Cp method using a heating ramp of 20° C./minute.

Transmission measurements were obtained using an HP 8453 UV-vis spectrophotometer at 630 nm. The values were not corrected for reflection at the surface of the parts or for light scattering through the thickness of the parts.

In the examples below, the percentages identified in the compositions are weight percentages, unless noted otherwise. "CS" indicates chainstopper and is in mol % paracumylphenol.

IBR values were measured by a KOCH CS-4/OT OPTIT-ESTER. The DVD disks were molded, and the birefringence measurements were made on the unmetallized, unbonded DVD substrates (0.6 mm disk).

The intrinsic ductility was performed in the following manner. BPA homopolycarbonate was molded at standard process conditions into "dogbone" shapes (gage section-0.125" thick; 0.500" wide tensile bars). The dogbones were placed into a TMI (TESTING MACHINES INC. Notching machine) carriage fixture and notches were machined on both sides so the roots were directly across from each other. Carriage speed was 2.5" minute, wheel speed was 850 rpm, notch depth was 0.100" (+/−0.002"), notch root radius was 0.010" (+/−0.002"), tooth −45 degree included angle.

The notched parts were placed on a flat metallic plate and put into a preheated (125° C.) oven to anneal for 5 hours. At 5 hours the oven was shut off and allowed to come to ambient temperature before removal. By annealing the parts, the effect of the processing on the ductility of the samples was removed, and only the inherent ductility was examined. Test bars were placed in an INSTRON universal tester, and tested in extension at a crosshead displacement rate of 0.05"/min and the load/displacement data was recorded. Using this data the energy under the load displacement curve up to the point where the part failed was determined.

Examples 1–3

The following three materials were extruded on a 30 mm twin screw extruder equipped with 10 barrels, a 2-holed die and a mild PC screw. The BCC 7% CS was synthesized by an interfacial process and had a "fluffy" consistency which made extrusion challenging. However, typical stable processing conditions included screw RPM of 200–250, and barrel temperatures at RT/180/260/260/260/260/260 C. Full vacuum was pulled at vacuum port located at barrel #9. Melt temperature at the die as measured by a melt probe varied from 282–285 C. Material was processed at 30 lbs/hr, at 60–65% torque. The intrinsic ductility (double notched tensile test) and Tg were measured on these materials and results are shown below. The Melt flow index, MFI (@250C, 1.2 kg plunger) measurements were completed on these materials and compared with BPA polycarbonate, LEXAN OQ1050C manufactured by GENERAL ELECTRIC. "High Flow SP" is LEXAN SP ML6069, a copolyestercarbonate of BPA and DDA comprising about 9 mol % residues of DDDA.

The terms "white", "yellow" and "blue" below are arbitrary designations which are used to identify the compositions.

TABLE 1

| Material ID | Composition | Mw | Tg (C) | MFI | Intrinsic Ductility (lbf-in) |
|---|---|---|---|---|---|
| Example 1 (comp.)* (white) | 100% BCC 7% CS | 29.193 | 136.67 | 4.05 | 0.744 +/− .196 |
| Example 2* (yellow) | 75%/25% BCC/High Flow SP (ML6069) | 32.723 | 135.98 | 4.02 | 4.848 +/− 1.54 |
| Example 3* (blue) | 50%/50% BCC/High Flow SP (ML6069) | 35.962 | 131.91 | 5.31 | 2.726 +/− .985 |
| Example 4 (comp.) | BPA polycarbonate | 33.266 | 142 | 10.8 | 0.599 +/− .151 |

*includes 200 ppm GMS, 400 ppm Irgaphos 168 and 0.2% distilled water

As shown in table 1, the addition of the high flow SP polyestercarbonate improves the ductility of dogbones comprised of BCC and also shows improvement over BPA polycarbonate (LEXAN OQ1050C) dogbones.

The materials were molded on the DISKJET 600, with an Axxicon DVD-mold (0.6 mm thickness mold) and a Philips DVD-RAM stamper. An experiment was designed, varying the mold and melt temperatures, the second clamp force (the clamp force during the second stage of the clamping profile) and the switch over point time (seconds) from injection-control to pressure-control. Representative results are set forth in Table 2.

TABLE 2

| | Switch-over point | 2nd Clamp Force (% of maximum) | Mould Temperature (degrees C.) | Melt Temperature (degrees C.) |
|---|---|---|---|---|
| Example 5 (comp.) (white) | 0 | 60 | 116 | 370 |
| Example 6 (yellow) | 3.8 | 40.5 | 118 | 370 |
| Example 7 (blue) | 0.48 | 40 | 109 | 370 |
| Example 8 (comp.) (BPA polycarbonate) | 1 | 47 | 120 | 370 |

In Table 3, properties of disks prepared at the conditions in Table 2 are set forth.

TABLE 3

| | Groove depth (nm) @ 25 mm | Groove depth (nm) @ 35 mm | Groove depth (nm) @ 50 mm | Birefringence minimum (nm) | Birefringence maximum (nm) | % Water uptake at equilibrium |
|---|---|---|---|---|---|---|
| Example 9 (comp.) (white) | 71 | 59 | 58 | −22 | 37 | 0.24 |
| Example 10 (yellow) | 58 | 55 | 62 | −1.22 | 25 | 0.26 |
| Example 11 (blue) | 57 | 65 | 51 | 4 | 44 | 0.28 |
| Example 12 (comp) (BPA polycarbonate) | 46 | 52 | 51 | −24 | 84 | 0.35 |

Results in Table 3 include the maximum single point of birefringence on a disk and the minimum single point on a disk, High-quality DVDs have maximum birefringence below 100 nm, preferably below 60 nm and average birefringence below 40 nm, preferably. The groove depths were measured by atomic force microscope, and compared to a stamper depth of 55 nm.

It is apparent that BCC polycarbonate and the BCC polycarbonate/SP blends have improved birefringence relative to BPA polycarbonate. In addition, the blends with high flow SP demonstrate improved pit replication. It is also apparent that these blends have a decreased water absorption (improved performance) relative to BPA polycarbonate.

The ductility of the molded DVD-RAM substrates were examined by a pass/fail test. Ten disks of each material were bent across the disk's centerline. A pass on this test was given for disks that bent without cracking. A fail was given to disks that cracked. The results of the disk bending tests are given as the number of disks passed/10 disks tested averaged over all molding conditions.

TABLE 4

| Material ID | Disk Bending |
|---|---|
| Example 13 (comp.) (white) | 0 |
| Example 14 (yellow) | 0 |
| Example 15 (blue) | 5.15 |
| Example 16 (comp.) BPA polycarbonate | 9.75 |

These results, in addition to the intrinsic ductility results (see above) show that the addition of polyestercarbonate improves the ductility as compared to BCC homopolymer.

As is clear from the results above, the addition of materials containing softblock (such as DDDA in the polyestercarbonate) improves the ductility of the material as seen in the disk test and the notched tensile test. Further the blends of the invention containing BCC show improved birefringence.

Examples 17–34

In Examples 17–34, the miscibility of BCC with BPA polycarbonate was observed. BCC homopolycarbonate (BCC) and BPA homopolycarbonate (BPA) were premixed and fed into a 28 mm WERNER AND PFLEIDERER extruder equipped with a mild PC screw and extruded at barrel temperatures of from about 260° C. to about 280° C. For examples 18–23, BCC (7 mole % chainstopper, Mw of 28,000 grams/mole) and BPA (LEXAN OQ 1050C, made by GENERAL ELECTRIC) were premixed and extruded. For examples 24–29, BCC (6 mole % chainstop, Mw of 32,000 grams/mole) and BPA (a mixture of LEXAN OQ 1050 C and LEXAN ML 5521, both made by GENERAL ELECTRIC) were premixed and extruded. For samples containing catalysts (indicated in the table below) 150 ppm tetrabutyl phosphonium tetraphenyl borate were added to the polymer prior to extrusion. The resulting pellets were then injection molded into disks. No phase separation was seen as is evident by the high transmission data.

TABLE 5

| Example | Composition | Mw | Mn | Tg | % Transmission at 630 nm |
|---|---|---|---|---|---|
| 17 | 0:100; BCC:BPA, catalyst | 27,400 | 13,100 | 142.7 | 84.3 |

TABLE 5-continued

| Example | Composition | Mw | Mn | Tg | % Transmission at 630 nm |
|---|---|---|---|---|---|
| 18 | 0:100; BCC:BPA, no catalyst | 27,800 | 13,200 | 143.1 | 85.4 |
| 19 | 25:75; BCC:BPA, catalyst | 27,300 | 12,900 | 142.1 | 85.4 |
| 20 | 50:50; BCC:BPA, catalyst | 26,700 | 12,400 | 141.6 | 84.3 |
| 21 | 50:50; BCC:BPA, no catalyst | 26,400 | 12,500 | 141.3 | |
| 22 | 75:25; BCC:BPA, catalyst | 26,200 | 12,200 | 141.2 | 84.2 |
| 23 | 0:100; BCC:BPA, catalyst | 28,900 | 13,600 | 144.2 | 85.1 |
| 24 | 0:100; BCC:BPA, no catalyst | 29,700 | 13,800 | 144.9 | 85.3 |
| 25 | 25:75; BCC:BPA, catalyst | 29,300 | 13,500 | 143.7 | 84.7 |
| 26 | 50:50; BCC:BPA, catalyst | 28,600 | 13,100 | 142.5 | 84.5 |
| 27 | 50:50; BCC:BPA, no catalyst | 29,500 | 13,400 | 143.9 | |
| 28 | 75:25; BCC:BPA, catalyst | 27,300 | 12,600 | 142.2 | 83.9 |
| 29 | 0:100; BCC:BPA, catalyst | 33,100 | 14,900 | 146.9 | 82.9 |
| 30 | 0:100; BCC:BPA, no catalyst | 32,700 | 14,700 | 146.7 | 83.2 |
| 31 | 25:75; BCC:BPA, catalyst | 32,300 | 14,500 | 145.5 | 83.6 |
| 32 | 50:50; BCC:BPA, catalyst | 32,100 | 14,300 | 143.9 | 83.5 |
| 33 | 50:50; BCC:BPA, no catalyst | 32,400 | 14,400 | 145.6 | |
| 34 | 50:50; BCC:BPA, catalyst | 30,900 | 14,100 | 143.8 | 84.0 |

Examples 35–46

In Examples 38–46, BPA polycarbonate (LEXAN PC120) or BCC polymer (7 mol % chainstop) and LEXAN SP1010 copolyestercarbonate (92:8 mol % BPA:DDDA) were premixed in a HENSCHEL mixer and fed into a 28 mm WERNER AND PFLEIDERER extruder equipped with a mild PC screw and extruded at barrel temperature of from about 260° C. to about 280° C. The amount of catalyst (tetrabutyl phosphonium tetraphenyl borate) was varied from about 0 to about 300 ppm. The resulting pellets were then injection molded into tensile bars using an ENGEL 30 ton injection molding machine. Catalyst efficiency was investigated by use of GPC and $^{13}C$ NMR. Molecular weights were generally insensitive to the amount of catalysts. This suggests that very little hydrolysis occurred during extrusion. In addition, $^{13}C$ NMR revealed that very little transesterification (copolymerization) occurred during the residence time in the extruder. No phase separation was seen as is evident by the high transmission data. This, together with the single Tg data indicates that both BPA polycarbonate and BCC polycarbonate are miscible with LEXAN SP.

TABLE 6

| EXAMPLE | COMPOSITION | Mw | Mn | Tg | % Transmission at 630 nm |
|---|---|---|---|---|---|
| 35 (comparative) | BPA (LEXAN 1050C) | 31,200 | 14,000 | 142 | 80.7 |
| 36 (comparative) | BPA/DDA copolyestercarbonate | 54,600 | 20,900 | 126 | |
| 37 (comparative) | BCC | 25,200 | 11,700 | 126.5 | |
| 38 | BCC, 300 ppm catalyst | 25,700 | 11,500 | 136.4 | 76.5 |
| 39 | BPA:SP1010; 50:50, no catalyst | 45,400 | 18,600 | 140.1 | 83 |
| 40 | BPA:SP1010; 50:50, 150 ppm catalyst | 43,800 | 18,300 | 138.2 | 86.3 |
| 41 | BCC:SP1010; 50:50, no catalyst | 39,300 | 14,700 | 133.7 | 78.2 |
| 42 | BCC:SP1010; 95:5; 150 ppm catalyst | | | 140.4 | 82.3 |
| 43 | BCC:SP1010; 75:25; 150 ppm catalyst | 39,500 | 16,200 | 138.7 | 83.1 |
| 44 | BCC:SP1010; 50:50; 150 ppm catalyst | 44,300 | 17,700 | 135.4 | 80.5 |
| 45 | BCC:SP1010; 50:50; 150 ppm catalyst | 40,000 | 15,200 | 135.2 | 83.1 |
| 46 | BCC:SP1010; 50:50; 300 ppm catalyst | 40,000 | 15,400 | 133.5 | 82.2 |

Examples 47–52

In examples 47–52, the water uptake data of molded dogbones (3.2 mm thickness) of various copolycarbonate blend and copolymer compositions are observed. Examples 51–52 are according to the present invention. As is clear from the examples, the blends of the present invention have equilibrium water absorption values which are improved relative to BPA. In addition, the diffusivities of the compositions containing BCC are also lower than for BPA which results in an even larger improvement in percent water uptake at 24 hours and at times before equilibrium is reached. For Example, while example 52 has an equilibrium water uptake of only about 22% lower than BPA, its diffusivity is 62% lower than BPA and thus its water uptake at 24 hours is 55% lower than BPA.

TABLE 7

| Example | Composition | % uptake at 24 hours | % uptake at 1 week | % uptake at equilibrium | Diffusivity × $10^8$ |
|---|---|---|---|---|---|
| 47 (comp.) | BCC, 7% CS | 0.03 | 0.07 | 0.22 | 0.31 |
| 48 (comp.) | 80:20 BCC:BPA copolymer | 0.6 | 0.15 | 0.26 | 1.0 |
| 49 (comp) | 47:47:6 BCC:BPA:DDDA terpolymer | 0.09 | 0.22 | 026 | 2.4 |
| 50 (comp) | BPA (OQ1020C) | 0.15 | 0.34 | 0.37 | 4.2 |
| 51 | 50:50 BCC:BPA blend | 0.091 | 0.23 | 0.29 | 1.8 |
| 52 | 50:50 BCC:SP blend | 0.067 | 0.18 | 0.29 | 1.6 |

The invention has been described in detail with particular reference to preferred embodiments thereof, but it will be understood that variations and modifications can be effected within the spirit and scope of the invention.

What is claimed is:

1. An optical article comprising a miscible polymer blend, the miscible polymer blend comprising A) from 1 to 99% by weight of a first polycarbonate comprising structural units having the formula (I)

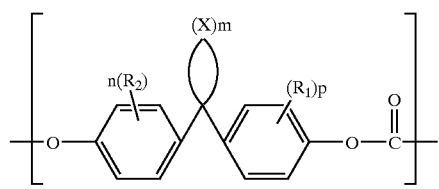
(I)

where $R_1$ and $R_2$ are independently selected from the group consisting of $C_1$–$C_6$ alkyl;
X represents $CH_2$;
m is an integer from 4 to 7;
n is an integer from 1 to 4; and
p is an integer from 1 to 4
with the proviso that at least one of $R_1$ or $R_2$ is in the 3 or 3' position;
and wherein the structural units of formula (I) comprise from 1 mol % to about 100 mol % of the first polycarbonate; and B) from 1 to 99% by weight of a second polycarbonate comprising structural units having the formula (II)

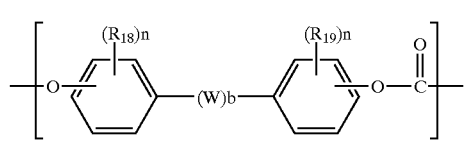
(II)

where
$R_{18}$ is independently selected from the group consisting of halogen, hydrogen, monovalent $C_1$–$C_6$ hydrocarbon, monovalent $C_1$–$C_6$ hydrocarbonoxy radicals,
$R_{19}$ is independently selected from the group consisting of halogen, hydrogen, monovalent $C_1$–$C_6$ hydrocarbon, and monovalent $C_1$–$C_6$ hydrocarbonoxy radicals;
W is selected from the group consisting of substituted or unsubstituted divalent $C_1$–$C_{18}$ hydrocarbon radicals,

—S—, —S—S—, —O—,

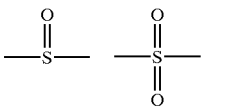

each n is independently selected from integers having a value of from 0 to 4 inclusive; and b is zero or one;
wherein the structural units of formula (II) comprise from about 1 to about 100 mol % of the second polycarbonate; and
wherein the total weight percent of first polycarbonate (A) and second polycarbonate (B) is equal to 100 weight percent.

2. The optical article of claim 1, wherein the miscible polymer blend has a water absorption below about 0.33%, and a Tg of from about 120° C. to about 185° C.

3. The optical article of claim 1, wherein component A) of the miscible polymer blend comprises from 90 to 100 mol % of a polycarbonate having structural units:

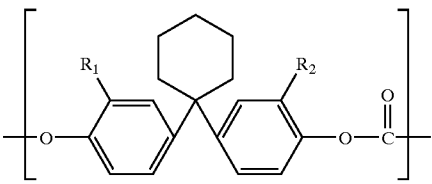

where $R_1$ and $R_2$ are $CH_3$.

4. The optical article of claim 1, wherein the second polycarbonate of the miscible polymer blend comprises from 90 to 100 mole % of residues of BPA.

5. The optical article of claim 1, wherein the second polycarbonate of the miscible polymer blend consists essentially of BPA.

6. The optical article of claim 1, wherein the first polycarbonate of the miscible polymer blend consists essentially of BCC and the second polycarbonate of the miscible polymer blend consists essentially of BPA.

7. The optical article of claim 1, wherein the second polycarbonate of the miscible polymer blend further comprises from 0.1 to about 20 mol % of structural

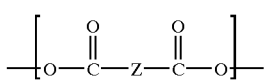

(III)

units having the formula (III)
wherein Z is a $C_1$–$C_{40}$ branched or unbranched alkyl or branched or unbranched cycloalkyl.

8. The optical article of claim 1, wherein the optical article is a medium for optical data storage.

9. The optical article of claim 1, wherein the optical article is a digital versatile disk.

10. A digital versatile disk comprising a miscible polymer blend, the miscible polymer blend comprising
   a) a first polycarbonate comprising a residue of 1,1-bis(4-hydroxy-3-methylphenyl)cyclohexane (BCC); 1,1-bis(4-hydroxy-3-methylphenyl)cyclopentane; 1,1-bis(4-hydroxy-3-methylphenyl)cycloheptane or a mixture thereof; and
   b) a second polycarbonate comprising a residue of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl)propane; or a mixture thereof;
   the miscible polymer blend having a Tg from about 120° C. to about 185° C. and a water absorption of below about 0.33%, and the digital versatile disk having an IBR in the range of about –100 nanometers to about 100 nanometers.

11. The digital versatile disk of claim 10, wherein the second polycarbonate further comprises a residue of dodecanedioic acid, sebacic acid, adipic acid, octadecanedioic acid, octadec-9-enedioic acid, 9-carboxyoctadecanoic acid and 10-carboxyoctadecanoic acid or a mixture thereof.

12. A digital versatile disk comprising a miscible polymer blend, the miscible polymer blend comprising
   a) from 1 to 99 weight % of a first polycarbonate comprising at least 90 mol % of residues of BCC and
   b) from 1 to 99 weight % of a second polycarbonate comprising at least 60 mole % of residues of BPA and from about 1 to about 10 mol % of residues of DDDA; wherein the total weight percent of first polycarbonate a) and second polycarbonate b) is equal to 100 weight percent;
   the miscible polymer blend having a water absorption of less than about 0.33% and a Tg of from about 120° C. to about 185° C., and the digital versatile disk having an IBR in the range of about –100 nanometers to about 100 nanometers.

13. The digital versatile disk of claim 12 having an IBR in the range of about –50 to about 50 nanometers.

14. A data storage media, the media comprising:
   1) a data layer, and
   2) a transparent overlayer adjacent to the data layer,
   wherein the transparent overlayer has a thickness of less than about 0.6 mm, and said transparent overlayer comprises a miscible polymer blend, the miscible polymer blend comprising
      A) from 1 to 99% by weight of a first polycarbonate comprising structural units having the formula (I)

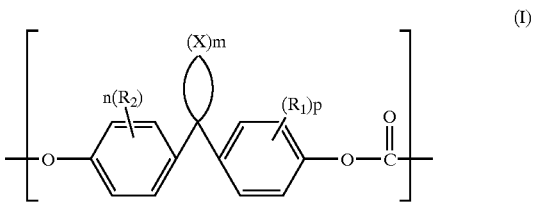

(I)

where $R_1$ and $R_2$ are independently selected from the group consisting of $C_1$–$C_6$ alkyl;
X represents $CH_2$;
m is an integer from 4 to 7;
n is an integer from 1 to 4; and
p is an integer from 1 to 4
with the proviso that at least one of $R_1$ or $R_2$ is in the 3 or 3' position;
and wherein the structural units of formula (I) comprise from 1 mol % to about 100 mol % of the first polycarbonate; and B) from 1 to 99% by weight of a second polycarbonate comprising structural units having the formula (II) where
   $R_{18}$ is independently selected from the group consisting of halogen, hydrogen, monovalent $C_1$–$C_6$ hydrocarbon, monovalent $C_1$–$C_6$ hydrocarbonoxy radicals,
   $R_{19}$ is independently selected from the group consisting of halogen, hydrogen, monovalent $C_1$–$C_6$ hydrocarbon, and monovalent $C_1$–$C_6$ hydrocarbonoxy radicals;
   W is selected from the group consisting of substituted or unsubstituted divalent $C_1$–$C_{18}$ hydrocarbon radicals,

—S—, —S—S—, —O—,

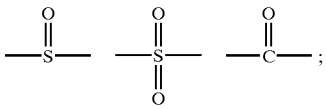

each n is independently selected from integers having a value of from 0 to 4 inclusive; and b is zero or one; wherein the structural units of formula (II) comprise from about 1 to about 100 mol % of the second polycarbonate; and
wherein the total weight percent of first polycarbonate (A) and second polycarbonate (B) is equal to 100 weight percent.

15. A data storage media, the media comprising:
   1) a data layer, and
   2) a transparent overlayer adjacent to the data layer,
   wherein the transparent overlayer has a thickness of less than about 0.6 mm, and said transparent overlayer comprises a miscible polymer blend, the miscible polymer blend comprising:
      a) from 1 to 99 weight % of a first polycarbonate comprising at least 90 mol % of residues of BCC and
      b) from 1 to 99 weight % of a second polycarbonate comprising at least 60 mole % of residues of BPA and from about 1 to about 10 mol % of residues of DDDA; wherein the total weight percent of first polycarbonate a) and second polycarbonate b) is equal to 100 weight percent.

16. The data storage media of claim 15 wherein the media is a digital versatile disk, wherein the miscible polymer blend has a water absorption of less than about 0.33% and a Tg of from about 120° C. to about 185° C., and the digital versatile disk having an IBR in the range of about −100 nanometers to about 100 nanometers.

* * * * *